Dec. 26, 1967 J. G. SPITZER ET AL 3,360,377
METHOD FOR PRODUCTION OF LOW-CALORIE MARGARINE SUBSTITUTE PRODUCTS
Filed April 10, 1964
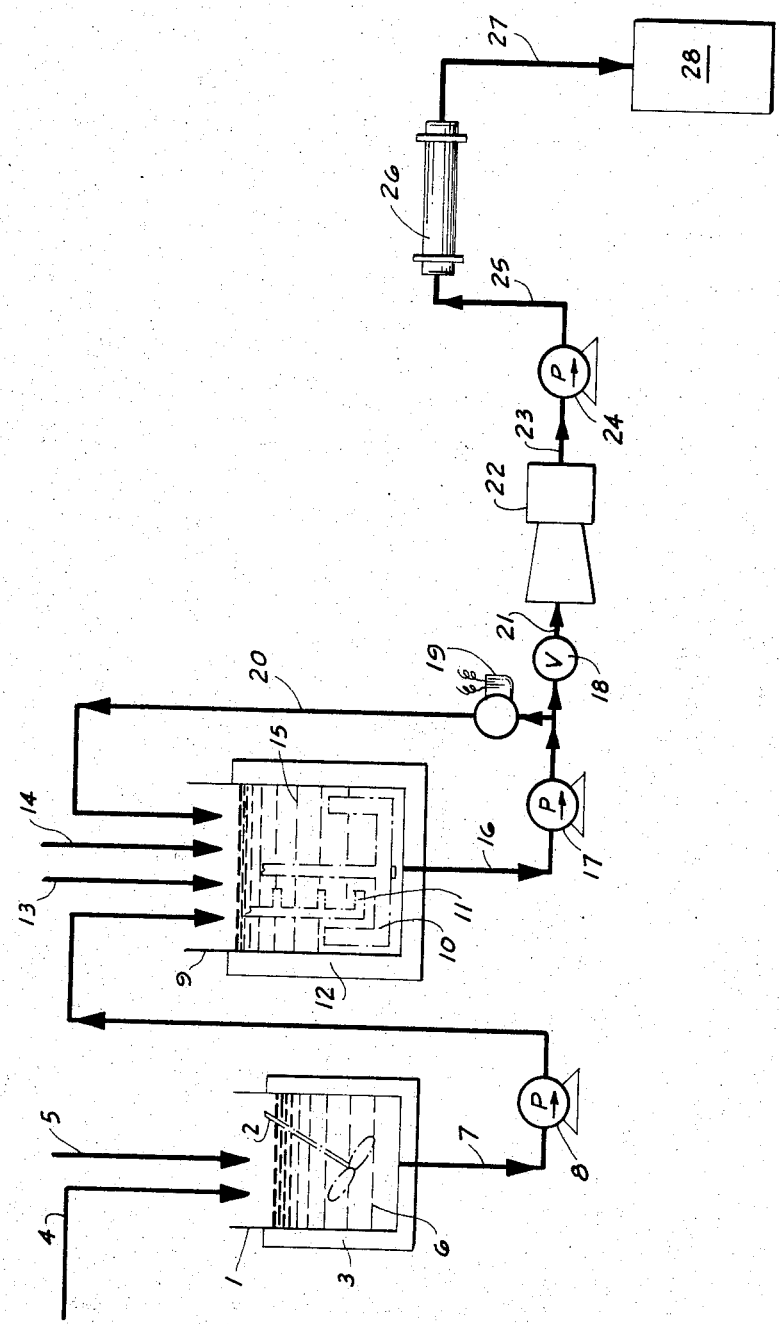
INVENTORS
JOSEPH G. SPITZER
JOHN J. KEARNS
OWEN COOPER
BY MORGAN, FINNEGAN, DURHAM & PINE
ATTORNEYS 3,360,377
METHOD FOR PRODUCTION OF LOW-CALORIE MARGARINE SUBSTITUTE PRODUCTS
Joseph George Spitzer, East Mamaroneck, N.Y., and John J. Kearns, Lawrence Township, Trenton, and Owen Cooper, Princeton, N.J.
Filed Apr. 10, 1964, Ser. No. 358,696
11 Claims. (Cl. 99—123)

This invention relates to a novel method for the production of low-calorie margarine-substitute products. Advantageously, the method of this invention permits more latitude in the processing conditions that may be employed in the production of low-calorie margarine-substitute products of good uniformity.

There has recently been developed low-calorie margarine compositions in the form of water-in-oil emulsions which resemble margarine sufficiently in appearance and performance so as to be useful as a substitute therefor. In general, such products are manufactured by mixing thoroughly, in appropriate amounts and at suitable temperatures, a water phase and an oil phase to form a water-in-oil (W/O) emulsion. The W/O emulsion is then cooled to a plastic state and subsequently packaged in a suitable manner. Such low-calorie compositions contain at least 45% by weight of water and have a much lower oil content than conventional margarine which contains about 80% oil. In such low-calorie products, the oleaginous materials which include the oil component and oleaginous emulsifier components, are in an amount from 20 to 55% by weight. Low calorie margarine-substitute products of the aforementioned type have a flow point (F.P.) in the range of 65 to 105° F., preferably 70 to 105° F., and penetrometer reading (P.R.) at 40° F. of 20 to 250, preferably 35 to 150, using a standard grease cone (3.2 cm. diameter, 45° angle, 150 grams added weight, 5 second interval).

In order to obtain low-calorie margarine-substitute products having optimum mouth feel and melt down properties, it is desirable to keep the level of emulsifying components rather low, e.g. 0.5% or less of the total composition. While the use of low levels of emulsifiers promotes good mouth feel and melt down characteristics, certain problems are encountered with respect to processing techniques and conditions required in maintaining the stability of the emulsion throughout the procesesing stages and in obtaining a final product of good uniformity.

First of all, in forming a W/O emulsion having a low oil content and a low level of emulsifiers, it is necessary to control the mixing temperature within a relatively narrow range. More particularly, in blending the aqueous phase and oil phase, elevated temperatures must be employed to ensure adequate dispersion of the water droplets throughout the oil phase. On the other hand, if the temperature is too high, the W/O emulsion may invert to an O/W emulsion.

Then too, a narrow degree of tolerance is permitted with respect to what emulsion holding temperatures and holding times may be employed in the transition of the W/O emulsion from a liquid to a plastic state in ensuring the production of a final product of good uniformity. When the level of emulsifiers is low, the W/O emulsion is much more sensitive to break-down between its initial formation up until it is converted to a plastic state by chilling.

Objects and advantages of the invention will be set forth in part hereinafter and in part will be obvious herefrom, or may be learned by practice with the invention, the same being realized and attained by means of the steps and methods pointed out in the appended claims.

The invention consists in the novel steps and methods herein shown and described.

An object of this invention is to provide a novel method for the production of low calorie margarine-substitute compositions of good uniformity.

A further object of this invention is to provide a novel method for the production of low-calorie margarine-substitute products which permit a wider latitude in the processing conditions that may be employed in the production of low-calorie margarine-substitute products of good uniformity.

Another object of this invention is to provide a novel method for the production of low-calorie margarine-substitute products of good uniformity in the form of a water-in-oil emulsion which permits a wider latitude both with respect to the mixing temperature that may be employed in the formation of the initial water-in-oil emulsion, and the emulsion holding temperature and holding time required in converting the emulsion from a liquid to a plastic state.

It has been found that the objects of this invention may be realized by: (1) forming a low-calorie, liquid, water-in-oil coarse emulsion comprising a continuous oil phase of an edible oil, and a dispersed water phase of water droplets consisting of at least 45% and not more than 80% by weight of the total composition; (2) subjecting said coarse emulsion to appropriate forces to produce a fine emulsion which generally is of a higher viscosity than the coarse emulsion; and (3) converting the fine emulsion from a liquid to the plastic state by the quick-chilling thereof at a satisfactory crystallization rate for the edible oil so that the resulting plastic emulsion is of a consistency whereby the plastic emulsion is capable of being immediately packaged without causing emulsion breakdown.

In carrying out the method of this invention, both the coarse emulsion and fine liquid emulsion should be maintained at a suitable temperature prior to the chilling operation whereby the emulsion remains stable. If the emulsion temperature is too high, the emulsion inverts from a W/O emulsion to an O/W emulsion while, if the emulsion temperature is too low, premature fat crystallization occurs resulting in water separation. The temperature range within which the emulsion remains stable varies depending upon the chemical make-up of the particular emulsion under consideration, particularly with respect to the nature and amount of emulsifying components, as well as the emulsion holding time employed which is dictated by the particular apparatus used. With the particular emulsion compositions described hereinafter in the specific examples, and produced by means of the equipment and procedures illustrated in the accompanying drawings, it was found that a suitable temperature range for maintaining emulsion stability is in the range of 73–113° F., and preferably 81–100° F.

The fine emulsion exhibits stability at a higher temperature than the coarse emulsion. It follows therefore that the maximum temperature of the aforementioned emulsion may be higher than indicated.

The temperature of the plastic emulsion emerging from the quick-chilling operation, and which is subsequently fed to packaging equipment, is also of importance. For convenience sake, this temperature will be referred to hereinafter as "emergent temperature." More particularly, the emergent temperature of the plastic emulsion should be such that the fat component thereof is crystallizing at a suitable rate so that the plastic emulsion is of a sufficiently high consistency, i.e. sufficiently hard or rigid to be effectively packaged, but is sufficiently plastic, i.e. non-brittle, that it may be readily transported to packaging equipment and packaged without any tendency of water to be liberated from the product when subjected to mechanical working during the transportation thereof to packaging equipment and the packaging thereof. With compositions of the type described in the specific examples described hereinafter, it has been found that a suitable crystallization rate for the fat component of the fine emulsion may be achieved if the fine emulsion is cooled at a rate of 0.1 to 3° F. per second, and preferably 0.6 to 1.5° F. per second. In order to achieve the desired cooling rate it has been found advantageous to subject the fine emulsion to agitation while being cooled, such, for example, as by quick-chilling the fine emulsion by means of a scraped surface heat exchanger, e.g. a Votator.

If the emergent temperature of the plastic emulsion is too low, the fat component thereof has crystallized and continues to crystallize at a higher rate than desired, resulting in a product that is too rigid. Not only are difficulties encountered in transporting such product to packaging equipment, because of the usual problems encountered in transporting a highly rigid material, but also, when mechanical working is imparted to the rigid emulsion in conveying the product to packaging equipment and during the packaging thereof, the product tends to crumble resulting in liberation of water therefrom. Such water separation of course results in breakdown of the emulsion product.

When the emergent temperature of the plastic emulsion is too high, the fat component has not crystallized at a sufficient rate so that the product is too soft to be packaged. Moreover, it has been found that in such product on standing the water droplets tend to agglomerate causing water to bleed from the product.

The optimum emergent temperature range for the plastic emulsion compositions formed in accordance with the method of this invention varies depending upon the chemical make-up of the emulsion. Good results have been obtained when the emergent temperature is in the range of 50–72° F., and preferably 52–65° F. Generally, the lower the melting point of the fat component, the lower is the optimum emergent temperature.

As will be readily apparent to those familiar with conventional margarine technology, the above-mentioned chilling techniques for producing low-calorie margarine substitute products, are quite different from those used in producing conventional margarine. More particularly, in the method of the present invention the low-calorie product emerging from the chilling operation is in the form of a non-liquid, i.e. a plastic state. In the production of conventional margarine, the high-fat liquid emulsion is generally cooled to 37–50° F., the product emerging from the cooling unit being in the form of a super-cooled liquid. This liquid is then piped to resting tubes in which the super-cooled fat crystallizes and the temperature rises to 54–61° F. At this temperature, conventional margarine is then of suitable consistency for molding and packaging. Without going through the super-cooling step, regular margarine would be too soft to pack immediately and would take excessively long to crystallize well enough to be handled in the equipment conventionally used in producing margarine.

From the above discussion, it is seen that the product emerging from the chilling unit in the conventional technique for producing margarine is in the form of a liquid in contrast to the plastic low-calorie margarine product emerging from the chilling unit in accordance with the method of the present invention. Also, the conventional margarine product is at a lower emerging temperature than the low-calorie product.

As indicated hereinbefore, the fine emulsion produced in accordance with this invention is of a higher viscosity than the coarse emulsion from which it is produced. In general, the fine emulsion, which is subsequently quick-chilled in the manner described hereinbefore, has a viscosity of at least 1,000 cps. at 92° F., the viscosity being generally in the range of 1,000 to 10,000 cps. at 92° F. (Brookfield Model LVF viscometer, spindle No. 3, 6 r.p.m.). The coarse emulsion, from which the fine emulsion is obtained in a manner described in detail hereinafter, in general, has a viscosity in the range of 100 to 5,000 cps. at 85° F. and preferably 600 to 2,000 cps. at 85° F.

In converting the coarse emulsion to the fine emulsion there is effected a reduction in the size of the dispersed water droplets. More particularly, the dispersed water droplets of the fine emulsion generally have an average particle size in the range of 1 to 10 microns. Normally, the coarse emulsion has an average particle size above 10 microns, generally in the range of 20 to 100 microns.

In converting a coarse emulsion to a fine emulsion in accordance with the method of this invention, the preferred technique is to subject the coarse emulsion to shearing forces. An appropriate technique for applying the desired shearing forces to the coarse emulsion is to pass the emulsion through a colloid mill wherein the emulsion passing between the surfaces of the rotor and the stator is subjected to shearing forces. An example of another type of apparatus that may be used for applying the desired shearing force is an ultrasonic homogenizer. The increase in viscosity is due to a reduction in the size of the dispersed water droplets.

In order to describe the present method more fully, there is now given a more detailed description for forming the coarse emulsion which is later converted to a fine emulsion and then quick-chilled, in accordance with the principles of this invention. The coarse W/O emulsion used in accordance with the method of this invention is formed by intimately mixing, in suitable amounts and at appropriate temperatures, an oil phase containing an edible oil component and a water phase. In order to ensure complete emulsification, it is desirable that when one phase is added to the other, e.g. adding the water phase to the oil phase, there be employed adequate agitation on mixing as well as controlling the rate of emulsification, e.g. adding 3% of the water phase per minute. Also, both the water phase and oil phase when mixed should be at an elevated temperature to ensure proper mixing. For example, the water phase may be at a temperature in the range of 50 to 105° F. and the oil phase at a temperature in the range of 80 to 140° F. After the initial formation of the W/O emulsion, the emulsion is held at an elevated temperature for a sufficient period of time with continuous mixing to ensure the production of a uniform blend in the form of a coarse W/O emulsion. As pointed out hereinbefore in detail, the coarse emulsion is maintained within a temperature of 73–113° F. to ensure emulsion stability.

The relative amounts of water and oleaginous components in the hereinbefore mentioned water phase and oil phase used in forming the coarse emulsion are such that water is in an amount of at least 45% by weight of the W/O emulsion and not greater than 80% by weight. The edible oil component of the oil phase is generally a glyceride ester of a 12 to 22 carbon atom fatty acid, preferably a triglyceride ester of 16 to 18 carbon atom fatty acid; e.g. cottonseed oil. Of course, the oleaginous material may be mixtures of esters of the aforedescribed type. Lower carbon atom fatty acid triglyceride esters such as coconut and palm kernel oil may also be judiciously employed. These oils or fats may be isomerized or modified and subjected to selective or non-selective hydrogenation in varying degrees. The fat or mixture of fats are typical of those used in conventional margarine technology.

The following examples A to J illustrate a number of different materials which may be used as the oleaginous component in accordance with this invention.

*Example A*

Pressed palm kernel oil, melting point, °F _____ 89
Solid content index, °F.
    50 _____ 59.4
    70 _____ 44.5
    90 _____ 0.5

Example B

Partially hydrogenated corn oil, melting point, °F__ 103
Solid content index, °F.
  50 _____ 46.6
  70 _____ 32.6
  90 _____ 7.5

Example C

Cottonseed oil:
  Iodine value, approx_____ 108
  Free fatty acid, max. percent_____ .05

Example D

A coconut oil rearranged with domestic vegetable oil:
  Melting point, °F _____ 92
  Iodine value_____ 45–50

Example E

A rearranged hardened coconut oil containing ½% lecithin:
  Melting point, °F_____ 94–96
  Iodine value_____ 1–2
Solid content index, °F.
  50 _____ 64
  70 _____ 55
  80 _____ 39
  92 _____ 9
  104 _____ 0

Example F

Partially hydrogenated corn oil:
A margarine oil in which one portion of the oil is selectively hydrogenated to a degree in excess of that characteristic of whole margarine fats and the other portion to a compensating lesser degree.
Melting point, °F_____ 94
Solid content index, °F.
  50 _____ 26.5
  70 _____ 14.4
  80 _____ 8.9
  92 _____ 2.3

Example G

Margarine oil made from cottonseed oil:
  Melting point: °F_____ 97
  Free fatty acid, max. percent_____ .05
Solid content index, °F.
  50 _____ 27
  70 _____ 17
  92 _____ 4
  Iodine value, approx_____ 75

Example H

Partially hydrogenated corn oil:
  Melting point, °F_____ 97.5
Solid content index, °F.
  50 _____ 40.6
  70 _____ 24.9
  80 _____ 17.3
  92 _____ 5.7

Example I

Hydrogenated cottonseed and soy oil:
  Melting point, °F_____ 99
Solid content index, °F.
  50 _____ 75
  70 _____ 70
  80 _____ 61
  92 _____ 25
  104 _____ 0

Example J

Liquid corn oil:
  Iodine value, approx_____ 123
  Free fatty acid, max. percent_____ 0.05

Additional examples of materials useful as the oleaginous component are the "Wecobee" oils which are hard butters produced from coconut oil. These oils contains a small amount (0.25%) of lecithin.

Examples of such oils are "Wecobee W" which has a M.P. of 94–96° F. with an iodine value of 10 max., and "Wecobee R" which has a M.P. of 101–103° F. with an iodine value of 4 max.

In general, the pH of the water phase is adjusted to 4 to 7. The preservative and color are added to the phase in which it is most soluble. Flavoring ingredients are generally added at the lowest practical temperature. After preparing the separate oil and water phases the water phase is added slowly to the oil phase with adequate agitation.

As indicated hereinbefore, the method of this invention is advantageously used in the production of low-calorie margarine-substitute products of low emulsifying level which results in a product having optimum mouth feel and melt down properties.

The term "low-calorie" as applied to the margarine-substitute product produced in accordance with the method of our invention means that the caloric content of such product, compared to convetnional margarine, has been reduced in an amount at least 25% and, preferably, at least 40%. By the term "conventional margarine" as used herein, we mean a margarine having at least 80% by weight of oleaginous components.

Products having the best mouth feel are those which have a melting or flow point at or below body temperature. In determining the flow point of the low-calorie margarine-substitute products produced in accordance with the method of this invention, the following procedure may be employed.

A 5 to 10 mg. sample previously conditioned to 65° F. is pressed lightly between two microscope cover glasses. The sample is placed on the hot plate of a Fisher-Johns melting point apparatus and the temperature increased to obtain approximate flow point range. When this range has been determined, the heating element is turned off, and as the temperature slowly drops, a fresh sample is placed in position and 30 seconds allowed to observe product flow. This procedure is continued using fresh samples until the appropriate flow point (i.e. the sample just barely flows in 30 seconds) is obtained.

A procedure that may be used for determining melting rate or melt-down property is as follows:

(1) Place a 1" x 1¼" x 1¼" sample at 40° F. in a small frying pan. The sample is placed on the square face. The frying pan is at 65–75° F.

(2) Invert a small watch glass (approximately 2 inches in diameter, weight—6.2 gms.) and place it firmly on the sample.

(3) Place the frying pan containing the sample and watch glass on a previously-heated hot plate set at low heat (Fisher, Heavy Duty Hot Plate 660 watts).

(4) The height of the sample is measured when the frying pan contacts the hot plate and the rate of slump is measured. A convenient way to do this is by placing a penetrometer (Koehler Instrument Co.) with a dial calibrated in 1/10 millimeters (mm.), over the sample and bringing the needle stem in contact with the watch glass. The needle stem weighs 15.5 gms. The reading of the penetrometer is recorded and measurements are made at 15-second intervals.

(5) For convenience, the rate of melting is reported as the change in height of the sample in 1/10 mm. in a 60-second interval.

Low-calorie margarine-like products formed in accordance with this invention have a suitable melting rate, when tested by the above procedure, when a sample of such product shows a reduction in height in the range of 3 to 12 mm., and preferably 7 to 10 mm.

Emulsifiers that may be used in producing the coarse emulsions described hereinbefore are emulsifying systems employing the combination of a 12–22 carbon atom fatty acid and a phospholipid or an hydroxyester of a polyol selected from the group consisting of propylene glycol, glycerol, sorbitan, monosaccharides and oligosaccharides. When emulsifying systems of the aforementioned type are employed, the level of total emulsifying components is generally in the range of 0.1 to 0.5%, preferably 0.15 to .25%, by weight of the low calorie composition, with the fatty acid component being in the range of 0.005 to 0.25% by weight, preferably .07 to .15%. Among preferred emulsifier combinations of the aforementioned type is the combination of a fatty acid, a phospholipid and at least one hydroxyester of the type mentioned hereinabove.

Examples of fatty acids suitable as emulsifying components are oleic acid, palmitic acid, stearic acid and combinations thereof. Examples of suitable hydroxyester emulsifier components are propylene glycol monostearate, monoglycerides of $C_{12}$–$C_{22}$ fatty acids, and combinations thereof. Phospholipid emulsifier components which have been found particularly suitable are phospholipids containing predominantly inositol phosphatides. A preferred phospholipid is Centrophil I.P. which is of the following composition:

| | Percent |
|---|---|
| Chemical lecithin | 2.5 |
| Chemical cephalin | 20 |
| Inositol phosphatides | 38.5 |
| Moisture and sugar | 6 |
| Cottonseed oil carrier | 33 |

Reference is now made to the accompanying drawing which is a flow sheet illustrating a mode of operation for carrying out the method of this invention. In the description which follows reference is made to apparatus and processing conditions which have been found to produce low-calorie margarine-substitute products having highly desirable properties.

In a water phase mix tank 1, provided with a paddle type agitator 2 and a temperature control water-jacket 3, there are intimately mixed, water, indicated by the line 4, and the water-soluble dry ingredient, i.e. salt, lactose, etc., indicated by the line 5, to form an aqueous water phase 6 temperature in the range of 50 to 150° F., e.g. 86° F. In an oil phase mix tank 9, provided with a sweep type paddle agitator 10, baffle 11 and a temperature control water jacket 12, there are intimately mixed, oil, indicated by the line 13, and the oil-soluble ingredients, i.e. emulsifier, color, flavors, etc., indicated by the line 14, to form an oil phase 15 at a temperature in the range of 80 to 140° F., e.g. 95° F.

The water phase 6 is added to the oil phase 15 in tank 9 through line 7 by means of transfer pump 8, there being employed adequate agitation on mixing as well as controlling the rate of emulsification, e.g. adding 3% of the water phase per minute. After initial formation of the W/O emulsion, the emulsion is held at a temperature in the range of 73–113° F., e.g. 86–88° F., for a sufficient period of time, e.g. 15 minutes, with continuous mixing to ensure the production of a uniform blend of a coarse W/O emulsion.

As shown in the accompanying flow diagram, there are provided a circulating pump 17, a manual valve 18 and a solenoid valve 19, whereby the coarse emulsion from line 16 may be fed either to recycle line 20 or line 21 leading to colloid mill 22. The purpose of recycling the coarse emulsion through line 20, if so desired, prior to feeding it to the colloid mill 22, is to further ensure adequate mixing of the coarse emulsion.

As indicated above, the coarse emulsion is pumped from line 16 by means of pump 17 to colloid mill 22 to produce the desired fine emulsion. An example of a suitable colloid mill is a Manton-Gaulin colloid mill at 0.035 inch opening, Normally, the emulsion exiting from the colloid mill through line 23 shows a slight temperature rise, e.g. the emulsion having a temperature of 91° F., due to the mechanical energy imparted thereto by the colloid mill.

The fine emulsion from line 23 is fed through line 25 by means of transfer pump 24 to Votator 26 to quick-chill the liquid fine emulsion and to convert it to a plastic product having the desired consistency. Generally, the temperature at which the chilled emulsion assumes an appropriate consistency is 50–72° F., e.g. 59° F. The plastic emulsion exiting from line 27 is then passed to conventional packaging equipment 28.

The following specific examples illustrate the method of this invention for the preparation of low-calorie margarine-substitute compositions:

In the examples which follow, a Brookfield Model LVF viscometer was used in determining the viscosity, Examples 1–4 using a spindle number 3, 6 r.p.m. and Example Number 5 employing a spindle number 4, 6 r.p.m.

The determination of the dispersed water phase particle size directly is very difficult due to the rapid breaking of the fine emulsion. A suitable technique has been developed in which the water droplets size is determined on the chilled product, which is as follows: 0.1 gram of a sample, previously cooled to 4° C., was placed on a glass microscope slide and covered with a glass cover slip. The cover slip is then pressed against the sample until the sample has spread to a sufficiently thin film for observation by transmitted light. The dispersed water droplets may then be observed and measured under the microscope. In some instances crystalline materials present in the sample interfere with observations of the water droplets. It then becomes necessary to warm the sample on the glass microscope slide until the crystals melt. The dispersed water droplets must be measured immediately upon becoming visible, since the droplets tend to coalesce when the sample melts.

*Example 1*

The following are formulations for a water phase and an oil phase which are subsequently combined in a manner described hereinafter in detail to form a coarse water-in-oil emulsion, the amounts indicated being in parts by weight:

OIL PHASE

| | |
|---|---|
| Margarine oil of Example A | 15.8 |
| Margarine oil of Example C | 23.7 |
| Stearic acid | 0.4 |
| Centrophil I.P. | 0.1 |

WATER PHASE

| | |
|---|---|
| Water | 53.8 |
| Salt | 3.2 |
| Lactose | 3.0 |

The oil soluble or dispersible components of the aforementioned oil phase are mixed and the resulting oil phase is heated for 20 minutes at 113° F.–122° F. until it is homogeneous. The water-soluble or dispersible components of the aforementioned water phase are mixed and the water phase is heated for 20 minutes at 86° F. until homogeneous.

The oil phase is then cooled to 86° F. after which the water phase at 86° F. is added to the oil phase using adequate agitation and adding the water phase at the rate of about 3% of the water phase per minute. The resulting emulsion is then held at 86° F. for fifteen minutes with continuous mixing to give a uniform blend in the form of a coarse emulsion having a viscosity of 800 c.p.s. at 86° F.

The coarse emulsion is then pumped through a Manton-Gaulin colloid mill at 0.035 inch opening, the particle size of the water droplets of the resulting fine emulsion being predominantly in the range of 1–10 microns, said emulsion having a viscosity of 7600 c.p.s. at 89° F. The fine emulsion is at a temperature of 89° F. there being a slight temperature rise due to the mechanical energy imparted by the colloid mill.

The fine emulsion is then pumped to a scraped surface heat exchanger (a Votator) whereby the emulsion is quick-chilled to the plastic state at a cooling rate of 1° F. per second, the chilled emulsion reaching a desirable consistency at 53° F. The resulting low-calorie margarine-substitute product has a flow point (F.P.) of 75° F. and a penetrometer reading (P.R.) at 40° F. of 85.

*Example 2*

The following are formulations for a water phase and an oil phase which are subsequently combined in a manner described hereinafter in detail to form a coarse water-in-oil emulsion, the amounts indicated being in parts by weight:

OIL PHASE

| | |
|---|---|
| Margarine oil of Example J | 19.00 |
| Margarine oil of Example B | 11.85 |
| Margarine oil of Example I | 6.65 |
| Butter fat | 0.50 |
| Stearic acid | 0.15 |
| Centrophil I.P. | 0.02 |
| Propylene glycol monostearate | 0.05 |
| Color-concentrate | 0.004 |
| Flavor (oil soluble) | 0.04 |

WATER PHASE

| | |
|---|---|
| Water | 56.146 |
| Salt | 3.00 |
| Lactose | 2.50 |
| Flavor (water soluble) | 0.02 |
| Preservative | 0.10 |

The oil soluble or dispersible components of the aforementioned oil phase are mixed and the resulting oil phase is heated for 20 minutes at 113° F.–122° F. until it is homogeneous. The water soluble or dispersible components of the aforementioned water phase are mixed and the water phase is heated for 20 minutes at 86° F. until homogeneous.

The oil phase is then cooled to 95° F. after which the water phase at 86° F. is added to the oil phase at 95° F. using adequate agitation and adding the water phase at the rate of about 3% of the water phase per minute. The resulting emulsion is then held at 86–90° F. for fifteen minutes with continuous mixing to give a uniform blend in the form of a coarse emulsion having a viscosity of 200 c.p.s. at 86° F.

The coarse emulsion is then pumped through a Manton-Gaulin colloid mill at 0.035 inch opening, the particle size of the water droplets of the resulting fine emulsion being predominantly in the range of 1–10 microns, said emulsion having a viscosity of 1400 cps. at 93° F. The fine emulsion is at a temperature of 93° F. there being a slight temperature rise due to the mechanical energy imparted by the colloid mill.

The fine emulsion is then pumped to a scraped surface heat exchanger (a Votator) whereby the emulsion is quick-chilled to the plastic state at a cooling rate of 1° F. per second, the chilled emulsion reaching a desirable consistency at 52–59° F. The resulting low-calorie margarine-substitute product has a flow point (F.P.) of 87° F. and a penetrometer reading (P.R.) at 40° F. of 92.

*Example 3*

The following are formulations for a water phase and an oil phase which are subsequently combined in a manner described hereinafter in detail to form a coarse water-in-oil emulsion, the amounts indicated being in parts by weight:

OIL PHASE

| | |
|---|---|
| Margarine oil of Example J | 19.00 |
| Margarine oil of Example B | 11.85 |
| Margarine oil of Example I | 6.65 |
| Butter fat | 0.50 |
| Stearic acid | 0.15 |
| Centrophil I.P. | 0.02 |
| Monoglycerides of liquid cottonseed oil | 0.07 |
| Color-concentrate | 0.004 |
| Flavor (oil soluble) | 0.04 |

WATER PHASE

| | |
|---|---|
| Water | 56.14 |
| Salt | 3.00 |
| Lactose | 2.50 |
| Flavor (water soluble) | 0.02 |
| Preservative | 0.10 |

The oil soluble or dispersible components of the aforementioned oil phase are mixed and the resulting oil phase is heated for 20 minutes at 113° F.–122° F. until it is homogeneous. The water soluble or dispersible components of the aforementioned water phase are mixed and the water phase is heated for 20 minutes at 86° F. until homogeneous.

The oil phase is then cooled to 95° F. after which the water phase at 86° F. is added to the oil phase at 95° F. using adequate agitation and adding the water phase at the rate of about 3% of the water phase per minute. The resulting emulsion is then held at 86–90° F. for fifteen minutes with continuous mixing to give a uniform blend in the form of a coarse emulsion having a viscosity of 600 cps. at 86° F.

The coarse emulsion is then pumped through a Manton-Gaulin colloid mill at 0.035 inch opening, the particle size of the water droplets of the resulting fine emulsion being predominantly in the range of 1–10 microns, said emulsion having a viscosity of 5700 cps. at 93° F. The fine emulsion is at a temperature of 93° F. there being a slight temperature rise due to the mechanical energy imparted by the colloid mill.

The fine emulsion is then pumped to a scraped surface heat exchanger (a Votator) whereby the emulsion is quick-chilled to the plastic state at a cooling rate of 1° F. per second, the chilled emulsion reaching a desirable consistency at 52–59° F. The resulting low-calorie margarine-substitute product has a flow point (F.P.) of 89° F. and a penetrometer reading (P.R.) at 40° F. of 95.

*Example 4*

The following are formulations for a water phase and an oil phase which are subsequently combined in a manner described hereinafter in detail to form a coarse water-in-oil emulsion, the amounts indicated being in parts by weight:

OIL PHASE

| | |
|---|---|
| Margarine oil of Example J | 19.00 |
| Margarine oil of Example B | 11.85 |
| Margarine oil of Example I | 6.65 |
| Butter fat | 0.50 |
| Stearic acid | 0.15 |
| Centrophil I.P. | 0.02 |
| Propylene glycol monostearate | 0.05 |
| Monoglycerides of liquid cottonseed oil | 0.07 |
| Color-concentrate | 0.004 |
| Flavor (oil soluble) | 0.04 |

WATER PHASE

| | |
|---|---|
| Water | 56.146 |
| Salt | 3.00 |
| Lactose | 2.50 |
| Flavor (water soluble) | 0.02 |

The oil soluble or dispersible components of the aforementioned oil phase are mixed and the resulting oil phase is heated for 20 minutes at 113° F.–122° until it is homogeneous. The water soluble or dispersible components of the aforementioned water phase are mixed and the water phase is heated for 20 minutes at 86° F. until homogeneous.

The oil phase is then cooled to 95° F. after which the water phase at 86° F. is added to the oil phase at 95° F. using adequate agitation and adding the water phase at the rate of about 3% of the water phase per minute. The resulting emulsion is then held at 86–90° F. for fifteen minutes with continuous mixing to give a uniform blend in the form of a coarse emulsion having a viscosity of 600 cps. at 89° F.

The coarse emulsion is then pumped through a Manton-Gaulin colloid mill at 0.035 inch opening, the particle size of the water droplets of the resulting fine emulsion being predominantly in the range of 1–10 microns, said emulsion having a viscosity of 6700 cps. at 93° F. The fine emulsion is at a temperature of 93° F. there being a slight temperature rise due to the mechanical energy imparted by the colloid mill.

The fine emulsion is then pumped to a scraped surface heat exchanger (a Votator) whereby the emulsion is quick-chilled to the plastic state at a cooling rate of 1° F. per second, the chilled emulsion reaching a desirable consistency at 52–59° F. The resulting low-calorie margarine-substitute product has a flow point (F.P.) of 89° F. and a penetrometer reading (P.R.) at 40° F. of 98.

*Example 5*

The following are formulations for a water phase and an oil phase which are subsequently combined in a manner described hereinafter in detail to form a coarse water-in-oil emulsion, the amounts indicated being in parts by weight:

OIL PHASE

| | |
|---|---|
| Margarine oil of Example B | 19.0 |
| Margarine oil of Example J | 19.0 |
| Propylene glycol monostearate | 0.2 |
| Decaglyceryl tristearate | 0.5 |
| Monoglycerides of liquid cottonseed oil | 0.1 |
| Color-concentrate | 0.004 |
| Flavor (oil soluble) | 0.02 |

WATER PHASE

| | |
|---|---|
| Water | 55.8 |
| Salt | 2.8 |
| Lactose | 2.5 |
| Preservative | 0.1 |

The oil soluble or dispersible components of the aforementioned oil phase are mixed and the resulting oil phase is heated for 20 minutes at 113° F.–122° F. until it is homogeneous. The water soluble or dispersible components of the aforementioned water phase are mixed and the water phase is heated for 20 minutes at 86° F. until homogeneous after which it was cooled to 62° F.

The oil phase is then cooled to 97° F. after which the water phase at 62° F. is added to the oil phase at 97° F. using adequate agitation and adding the water phase at the rate of about 3% of the water phase per minute. The resulting emulsion is then held at 79° F. for fifteen minutes with continuous mixing to give a uniform blend in the form of a coarse emulsion.

The coarse emulsion is then pumped through a Manton-Gaulin colloid mill at 0.035 inch opening, the particle size of the water droplets of the resulting fine emulsion being predominantly in the range of 1–10 microns, said emulsion having a viscosity of 14,000 cps. at 83° F. The fine emulsion is at a temperature of 83° F. there being a slight temperature rise due to the mechanical energy imparted by the colloid mill.

The fine emulsion is then pumped to a scraped surface heat exchanger (a Votator) whereby the emulsion is quick-chilled to the plastic state at a cooling rate of 1° F. per second; the chilled emulsion reaching a desirable consistency at 52–59° F. The resulting low-calorie margarine-substitute products has a flow point (F.P.) of 81.5 and a penetrometer reading (P.R.) at 40° F. of 109.

*Example 6*

The following are formulations for a water phase and an oil phase which are subsequently combined in a manner described hereinafter in detail to form a coarse water-in-oil emulsion, the amounts indicated being in parts by weight:

OIL PHASE

| | |
|---|---|
| Margarine oil of Example J | 19.25 |
| Margarine oil of Example B | 12.0 |
| Margarine oil of Example I | 6.75 |
| Centrophil I.P. | 0.02 |
| Propylene glycol monostearate | 0.05 |
| Monoglycerides of liquid cottonseed oil | 0.07 |
| Color-concentrate | 0.004 |
| Flavor (oil soluble) | 0.04 |

WATER PHASE

| | |
|---|---|
| Water | 56.05 |
| Salt | 3.00 |
| Lactose | 2.50 |
| Flavor (water soluble) | 0.001 |
| Preservative | 0.10 |

The oil soluble or dispersible components of the aforementioned oil phase are mixed and the resulting oil phase is heated for 20 minutes at 113° F.–122° F. until it is homogeneous. The water soluble or dispersible components of the aforementioned water phase are mixed and the water phase is heated for 20 minutes at 86° F. until homogeneous.

The oil phase is then cooled to 95° F. after which the water phase at 86° F. is added to the oil phase at 95° F. using vigorous agitation and adding the water phase at the rate of about 3% of the water phase per minute. The resulting emulsion is then held at 86–90° F. for fifteen minutes with continuous mixing to give a uniform blend in the form of a coarse emulsion having a viscosity of 200 cps. at 86° F.

The coarse emulsion is then pumped through a Manton-Gaulin colloid mill at 0.035 inch opening, the resulting fine emulsion having a viscosity of 2200 cps. at 93° F. The fine emulsion is at a temperature of 93° F. there being a slight temperature rise due to the mechanical energy imparted by the colloid mill.

The fine emulsion is then pumped into a scraped surface heat exchanger (a Votator) whereby the emulsion is quick-chilled to the plastic state at a cooling rate of 1° F. per second, the chilled emulsion reaching a desirable consistency at 50° F. The resulting low-calorie margarine-substitute product has a flow point (F.P.) of 89° F. and a penetrometer reading (P.R.) at 40° F. of 95.

The invention in its broader aspects is not limited to the specific steps and methods described but departures may be made therefrom within the scope of the accompanying claims without departing from the principles of the invention and without sacrificing its chief advantages.

What is claimed is:

1. A novel method for the production of a stable plastic edible low-calorie margarine-substitute composition of good mouth feel and melt down properties, in the form of a water-in-oil emulsion, said method comprising: forming a low-calorie, liquid, water-in-oil coarse emulsion comprising a continuous oil phase containing an edible oil and an emulsifying system at an emulsifier level of .1 to .5% by weight of the total composition the emulsifying agent of the emulsifying system being selected from the group consisting of (a) the combination of a phospholipid and a compound selected from the group consisting of 12–22 carbon atom fatty acids, (b) the combination of a phospholipid and a hydroxyester of a $C_{12}$–$C_{22}$ carbon atom fatty acid with a polyol selected from the group consisting of propylene glycol, glycerol, sorbitan, monosaccharides and oleosaccharides, and (c) hydroxyesters of a $C_{12}$–$C_{22}$ carbon atom fatty acid with a polyol selected from the group consisting of propylene glycol, sorbitan, monosaccharides and oligosaccharides, and a dispersed water phase of water droplets consisting of at least 45% and not more than 80% by weight of the total composition; the coarse and fine emulsion being maintained at a temperature not greater than 113° F., subjecting said coarse emulsion to appropriate forces to produce a fine emulsion; and converting the fine emulsion from a liquid to the plastic state by the quick-chilling thereof at satisfactory crystallization rate for the edible oil so that the resulting plastic emulsion is capable of being immediately packaged without causing emulsion breakdown, the temperature of the plastic emulsion emerging from the chilling operation being at a temperature of at least 52° F.

2. The method according to claim 1 wherein the forces applied to the coarse emulsion in the production of the fine emulsion are shearing forces.

3. The method according to claim 1 wherein the fine emulsion is quick-chilled at a cooling rate of .1 to 3° F. per second.

4. The method according to claim 1 wherein the fine emulsion is quick-chilled by applying it to a scraped surface heat exchanger.

5. The method according to claim 1 wherein the coarse emulsion and fine emulsion, prior to chilling of the fine emulsion, are maintained at a temperature within the range of 73–113° F.

6. The method according to claim 1 wherein the temperature of the plastic emulsion emerging from the chilling operation is at a temperature in the range of 50–72° F.

7. The method of claim 1 wherein the coarse emulsion and fine emulsion, prior to chilling of the fine emulsion, are maintained at a temperature within the range 73–113° F., and wherein the temperature of the plastic emulsion emerging from the chilling operation is at a temperature in the range of 52–65° F.

8. The method of claim 1 wherein the coarse emulsion and fine emulsion, prior to the chilling of the fine emulsion, are maintained at a temperature within the range of 81–100° F., and wherein the temperature of the plastic emulsion emerging from the chilling operation is at a temperature in the range of 52–65° F.

9. A novel method for the production of a stable plastic edible low-calorie margarine-substitute composition in the form of a water-in-oil emulsion, said method comprising: forming a low-calorie, liquid, water-in-oil coarse emulsion comprising a continuous oil phase containing an edible oil and an emulsifying composition, and a dispersed water phase of water droplets consisting of at least 45% and not more than 80% by weight of the total composition; subjecting said coarse emulsion to shearing forces to produce a fine emulsion; and converting the fine emulsion from a liquid to the plastic state by the quick-chilling thereof at a cooling rate of .1 to 3° F. in seconds resulting in a plastic W/O emulsion of good uniformity.

10. The method of claim 9 wherein the coarse emulsion and fine emulsion, prior to the chilling of the fine emulsion, are maintained at a temperature within the range of 73–113° F., and wherein the temperature of the plastic emulsion emerging from the chilling operation is at a temperature in the range of 52–65° F.

11. The method of claim 9 wherein the coarse emulsion and fine emulsion, prior to the chilling of the fine emulsion, are maintained at a temperature within the range of 81–100° F., and wherein the temperature of the plastic emulsion emerging from the chilling operation is at a temperature in the range of 52–65° F.

References Cited
UNITED STATES PATENTS

| | | | |
|---|---|---|---|
| 1,144,539 | 6/1915 | Grelck | 99—122 |
| 2,220,976 | 11/1940 | Schou | 99—123 |

OTHER REFERENCES

Andersen, A.J.C., "Margarine," 1954, Academic Press, N.Y. pages 140, 155, 156, 224, 228.

MAURICE W. GREENSTEIN, *Primary Examiner.*